Oct. 3, 1967  B. L. FROST  3,344,688
LIMITED SLIP DIFFERENTIAL
Filed Dec. 29, 1965  2 Sheets-Sheet 1

INVENTOR
BARRY L. FROST
BY Robert H Johnson
ATTORNEY

Oct. 3, 1967  B. L. FROST  3,344,688
LIMITED SLIP DIFFERENTIAL
Filed Dec. 29, 1965  2 Sheets-Sheet 2

INVENTOR
BARRY L. FROST
BY *Robert H Johnson*
ATTORNEY

United States Patent Office 3,344,688
Patented Oct. 3, 1967

3,344,688
LIMITED SLIP DIFFERENTIAL
Barry L. Frost, Jackson, Mich., assignor to Clark Equipment Company, a corporation of Michigan
Filed Dec. 29, 1965, Ser. No. 517,340
2 Claims. (Cl. 74—711)

This invention relates to automotive differentials, and more particularly to limited slip or locking differentials.

An inherent characteristic of the conventional differential is that when one of the wheels loses substantially all traction the differential operates so that substantially no torque is transmitted to the other wheel still having traction. As a result virtually no power is transmitted from the associated vehicle engine to the ground with the result that the vehicle cannot move. In order to overcome this problem limited slip or locking differentials have been proposed and a great many different ones have been developed. While limited slip differentials are very desirable in many applications, their use has not been widespread because they tend to be bulky, complex and expensive to manufacture. It is a principal object of my invention to provide a limited slip differential which is compact, simple and of relatively low cost to manufacture.

In carrying out my invention in a preferred embodiment I provide a differential having a rotatable case which carries a spider. A pair of opposed side gears are mounted for rotation in the case and a friction plate is disposed between each side gear and the case, each friction plate having teeth along the outer periphery thereof. A plurality of pinion gears are mounted for rotation on the spider and mesh with both side gears. A plurality of retarding gears also are mounted on the spider for rotation and mesh with the pinion gears and the teeth of both friction plates.

Figure 1:
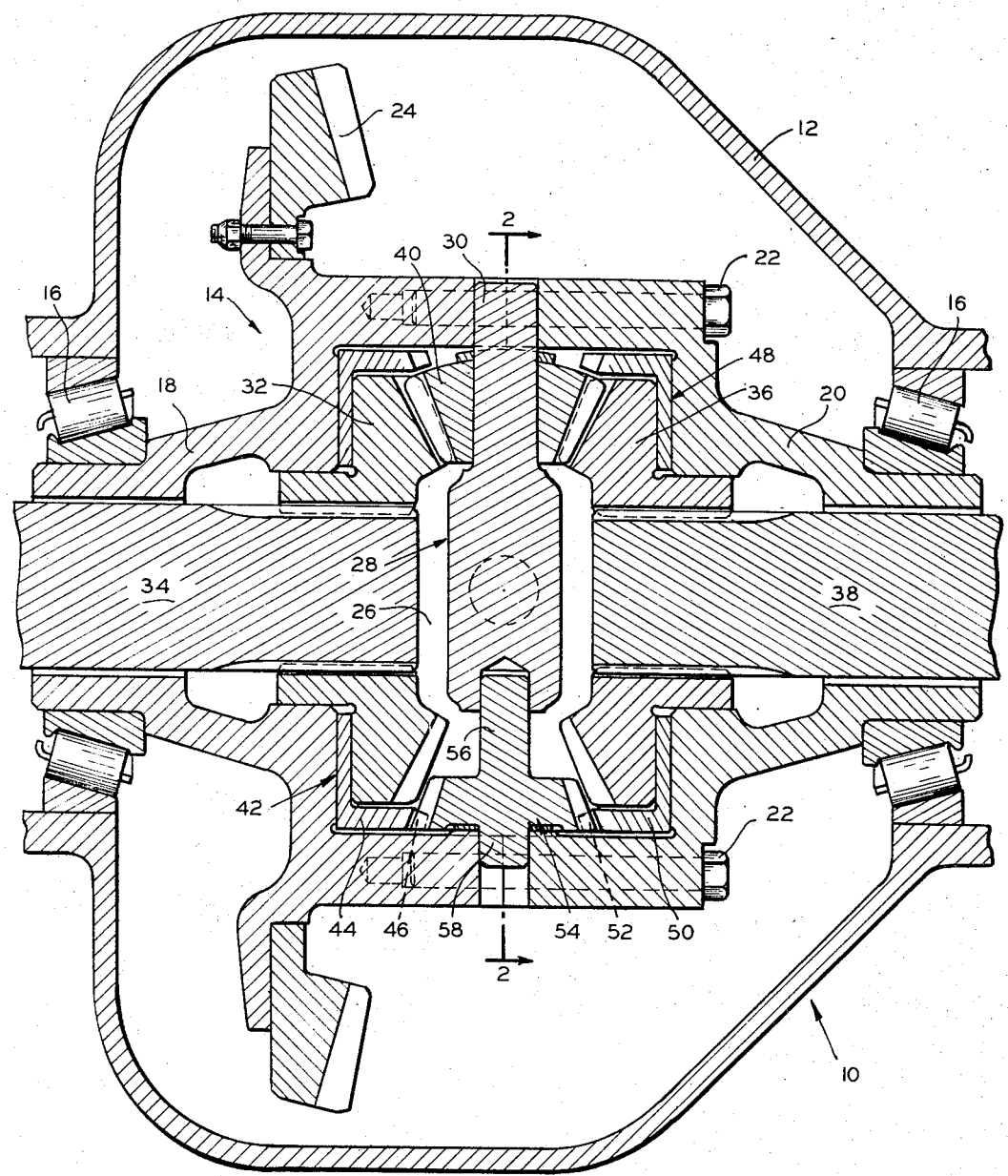
Figure 2:
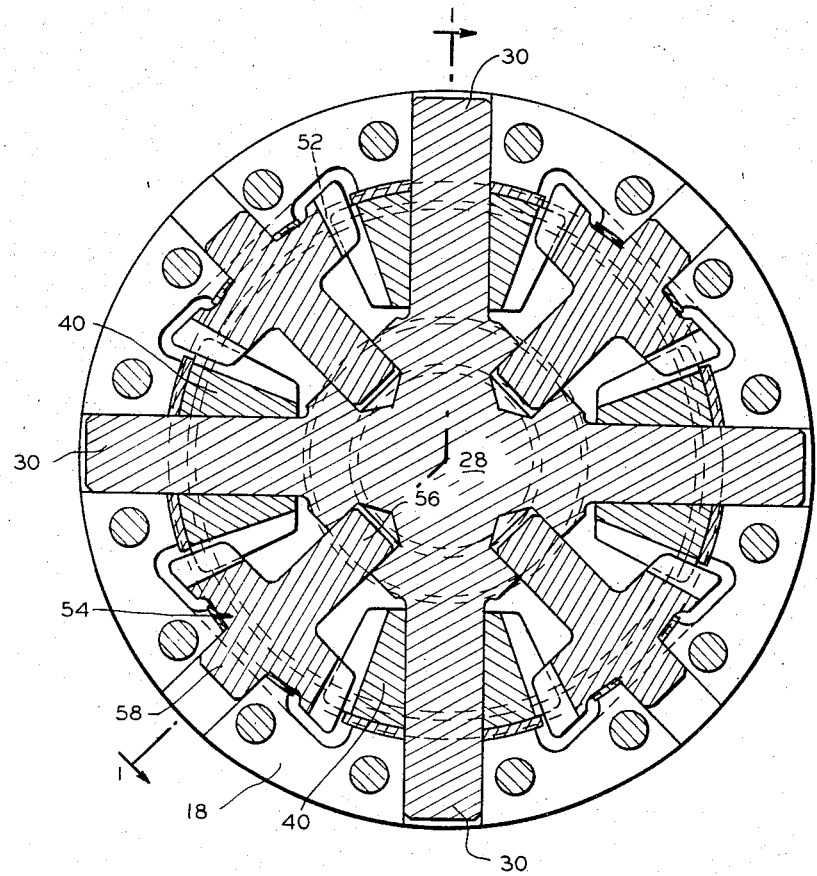

The above and other objects, features and advantages of my invention will be more readily understood by persons skilled in the art when the following detailed description is taken in conjunction with the accompanying drawing wherein:

FIGURE 1 is a longitudinal section of my improved limited slip differential taken along line 1—1 of FIG. 2, and FIGURE 2 is a cross section taken along line 2—2 of FIG. 1.

Referring now to FIGS. 1 and 2, the reference numeral 10 denotes generally a differential which is disposed within an axle housing 12.

Differential 10 includes a case 14 which is rotatably journaled in housing 12 by means of a pair of roller bearings 16. Case 14 is made up of two sections 18 and 20 which are held together by a plurality of machine screws 22. A ring gear 24 is bolted to casing section 18 and, as is conventional, is driven by an engine.

Case sections 18 and 20 cooperate to define a chamber 26 therebetween. Disposed in chamber 26 is a spider 28 which has four outwardly extending and equidistantly spaced legs 30. The legs 30 are disposed between case sections 18 and 20 so that spider 26 is held securely in place in case 14.

A side gear 32 is disposed between case section 18 and spider 28 and rotatably journaled in case section 18. Side gear 32 is internally splined to receive the splined portion of an axle shaft 34 to which a wheel, not shown, is connected at the outer end thereof. Similarly, a side gear 36 is disposed between case portion 20 and spider 28 and rotatably journaled in case portion 20. Also, side gear 36 is internally splined to accept the splined portion of an axle shaft 38 to which a wheel, not shown, is connected at the outer end thereof.

Mounted for rotation on each spider leg 30 is a pinion gear 40 which meshes with both side gears 32 and 36.

The differential as described thus far is conventional and would not have any limited slip or locking characteristics. The structure described hereinbelow cooperates with the previously described structure to provide a differential having limited slip or locking characteristics.

Disposed in chamber 26 between side gear 32 and case section 18 is a friction plate 42 with an inwardly extending portion 44 which carries a set of gear teeth 46 around the periphery thereof. A friction plate 48 is disposed in chamber 26 between side gear 36 and case section 20. Friction plate 48 includes an inwardly extending portion 50 which carries a plurality of gear teeth 52 at the periphery thereof.

Disposed between and meshing with both adjacent pinion gears 40, as can best be seen in FIG. 2, are gears 54. Each gear 54 includes an integral shaft portion 56 which is rotatably journaled in spider 28 and an integral shaft portion 58 which is rotatably journaled between case sections 18 and 20. Also, it will be noted that gears 54 mesh with both gear teeth 46 and gear teeth 52. While gears 54 are shown in mesh with both adjacent pinion gears 40, it will be understood that differential 10 would operate in the same manner if gears 54 meshed with only one of the adjacent pinion gears 40.

In order to enable persons skilled in the art to better understand my invention, I will now explain the operation of it. It will be assumed that my novel differential is associated with a vehicle which is propelled forward when ring gear 24 is driven in a clockwise direction, as viewed from the left in FIG. 1, and that drive wheels are connected to the outer ends of axle shafts 34 and 38. Assuming now that ring gear 24 is being driven in a clockwise direction and that the associated vehicle is proceeding in a substantially straight line so that the wheels connected to the axle shafts 34 and 38 are rotating at substantially the same speed there will be a substantially equal division of torque by differential 10 between side gears 32 and 36 with the result that pinion gears 40 and gears 54 will not rotate about their axes of revolution. It will be noted, however, that due to the well-known reaction between meshing gears that side gear 32 will be biased axially toward case section 18 in proportion to the amount of torque being transmitted by it. Similarly, side gear 36 will be biased toward case section 20 in proportion to the amount of torque being transmitted by it. The axial biasing of side gears 32 and 36 is of no consequence regarding the limited slip or locking characteristics of the differential so long as each wheel connected to axle shafts 34 and 38 encounters the same torque requirements and has the same traction at the ground.

Assuming that it is desired to have the vehicle turn toward the left so that the wheel associated with axle shaft 34 has to rotate faster than the wheel associated with axle shaft 38, side gear 32 will rotate faster than side gear 36. As a result pinion gears 40 and gears 54 also must begin to rotate. Because side gear 32 is rotating faster than differential case 14 in a clockwise direction, as viewed from the left in FIG. 1, pinion gears 40 and gears 54 will rotate to cause friction plate 42 to rotate in the opposite direction from gear 32 and slower than case 14 as viewed from the left in FIG. 1, and cause friction plate 48 to rotate in the opposite direction from gear 36 and faster than case 14, as viewed from the left in FIG. 1. It will be noted that the biasing of side gear 32 toward case section 18 tends to retard rotation of friction plate 42 and that the biasing of side gear 36 toward case section 20 tends to retard rotation of friction plate 48. Because of the difference in direction and speed of rotation of the friction plates and side gears, the amount of retardation of rotation of the friction plates caused by the outward bias of the side gears is substantially increased. At this point it will be appreciated that by increasing the amount of torque supplied to differential 10 the outward bias on side gears 32 and 36 will be increased and as a result retardation of rotation of friction plates 42 and 48 will be increased. If the retardation of these friction plates is great enough, then any differential action of differential 10 can be prevented. Thus, if the wheel attached to axle shaft 34 is setting on a surface with a low coefficient of friction, then by increasing the torque supplied to differential 10 tractive effort can be supplied to the wheel connected to axle shaft 38.

While only a single preferred embodiment of my invention has been described in detail hereinabove, it will be understood that this description is intended to be illustrative only since various changes, modifications and the like which are within the scope and spirit of my invention may occur to others skilled in the art. Thus the limits of my invention should be determined from the following appended claims.

I claim:

1. A limited slip differential comprising a rotatable case, a spider mounted in the said case, a pair of opposed side gears mounted for rotation in the said case, a friction plate disposed between each side gear and the said case, each friction plate having teeth along the outer periphery thereof, a plurality of pinion gears mounted on the said spider for rotation, the said pinion gears meshing with both side gears, and a plurality of gears mounted on the said spider for rotation, each of the said last-mentioned gears being disposed between adjacent pinion gears and meshing with at least one of the said adjacent pinion gears, the said last-mentioned gears also meshing with the said teeth of both friction plates.

2. A limited slip differential as set forth in claim 1 wherein each of the said last-mentioned gears meshes with both of the said adjacent pinion gears.

References Cited

UNITED STATES PATENTS

| | | | |
|---|---|---|---|
| 1,324,856 | 12/1919 | Taylor. | |
| 1,324,860 | 12/1919 | Taylor. | |
| 1,324,861 | 12/1919 | Taylor. | |
| 1,682,386 | 8/1928 | Lewis. | |
| 1,988,183 | 1/1935 | Whitcomb | 74—711 |
| 2,121,915 | 6/1938 | Ifield | 74—711 |
| 2,132,692 | 10/1938 | Lawrence. | |
| 2,424,942 | 7/1947 | Mynssen. | |
| 2,624,216 | 1/1953 | Nielsen | 74—711 |
| 2,971,404 | 2/1961 | Thornton. | |
| 3,051,020 | 8/1962 | Hartupee. | |
| 3,053,114 | 9/1962 | Singer. | |

DONLEY J. STOCKING, *Primary Examiner.*

L. H. GERIN, *Assistant Examiner.*